United States Patent [19]

Ceccherini

[11] Patent Number: 5,100,302
[45] Date of Patent: Mar. 31, 1992

[54] QUICK DISASSEMBLY SYSTEM FOR ROTARY VACUUM PUMPS

[75] Inventor: Massimo Ceccherini, Florence, Italy

[73] Assignee: Galileo Vacuum Tec, S.p.A., Florence, Italy

[21] Appl. No.: 563,250

[22] Filed: Aug. 6, 1990

[30] Foreign Application Priority Data

Aug. 10, 1989 [IT] Italy ................... 9509 A/89

[51] Int. Cl.⁵ ............................................. F04B 17/00
[52] U.S. Cl. ................................. 417/360; 417/423.15
[58] Field of Search ............. 417/360, 410, 423.6, 417/423.15; 418/96

[56] References Cited

U.S. PATENT DOCUMENTS

| | | | |
|---|---|---|---|
| 3,545,892 | 12/1970 | Zimmermann | 417/360 |
| 4,211,519 | 7/1980 | Mogan | 417/360 |
| 4,283,167 | 8/1981 | Bassan | 418/96 |
| 4,695,232 | 9/1987 | Klauck | 417/410 |
| 4,797,071 | 11/1989 | Veyrat | 417/410 |
| 4,900,438 | 2/1990 | McEwen | 417/360 |

FOREIGN PATENT DOCUMENTS

367846  7/1988  European Pat. Off. ............ 417/360

Primary Examiner—Richard A. Bertsch
Assistant Examiner—Peter Korytnyk
Attorney, Agent, or Firm—McGlew & Tuttle

[57] ABSTRACT

The vacuum pump is subdivided into: a first part (13), consisting of an "actuating module" comprising the electric motor (15) and a support structure (16) containing both the half-couple (37) of the transmission coupling (35, 37), and the channels (53, etc.) and connections for the intake and delivery of the gases, connected to the various external pipes (47, etc.) and emerging at a coupling surface (C—C); and a second functional part (11), constituting a "pump module" and comprising the rotor or rotors (24, 25) with the associated rotating axle (33) complete with half-couple (35), the stators (21) and the delivery valves contained in a housing (27) which contains the special liquid for leaktightness and lubrication, which can be coupled to and uncoupled from the "actuating module" at said coupling surface (C—C), where corresponding connections emerge.

10 Claims, 3 Drawing Sheets

QUICK DISASSEMBLY SYSTEM FOR ROTARY VACUUM PUMPS

FIELD OF THE INVENTION

The present invention relates to vacuum pumps and in particular to vacuum pumps which are separable between a pump module and an actuating module for service, maintenace and the like.

BACKGROUND OF THE INVENTION

A typical form for a rotary vacuum pump, already known, is shown in FIG. 1. It comprises a body inside which the rotor rotates eccentrically, which holds the running blades and performs the actual pumping; the aforesaid assembly 1, taken as a whole, is also called the "working block". It is generally connected by screws 3 to a stand 2 which also supports the actuating motor 4. A flexible coupling 5 enables the motion to be transmitted to the rotor of the pump. Lubrication is carried out by causing the oil contained in the rigid casing (housing) 6 to penetrate inside the block 1, said block 1 being immersed inside the housing. The oil which enters the block 1 is then expelled, together with the pumped gas, from the delivery valves and mixes again continually with the oil of the housing 6. For the sake of leak-tightness mechanical play between moving parts (rotor and blades) and fixed parts (body or stator) is very small and precise; the lubricating oil serves to complete the seal by forming liquid films which seal the aforesaid parts moment by moment. So it will be appreciated how the vacuum seal (and hence the efficiency of the pump) can be harmed both by a fall in the properties of the oil and by any dust that may be present, which will be more or less abrasive and obstructive in the internal oil ducts. Rotary pumps are generally powered by an electric motor 4 positioned on their axles. The pump-motor complex is mounted on a base which may be of various kinds, such as 7.

The rotary pump complete with motor is often part of a pump station—stationary or mobile which is erected upon and partially closed by a trestle or frame or bench or cabinet. In such a station the rotary pump, being an element that is in motion and relatively heavy, generally occupies the lower part; the fact that the pump is in this position, and the "compactness" of the station make for complex operations to remove said pump, when it is necessary to perform the inevitable maintenance operations upon it. The frequency of this maintenance depends essentially on the conditions of use, in particular on the working pressure and the nature of the gases that are being pumped. Many applications do in fact exist which demand very frequent maintenance because of the suction of polluting and corrosive gases, sometimes also drawing in abrasive dusts. Correct use of the pump therefore requires operations which range from simply filling up with oil through a total change of the oil load, cleaning the internal parts and replacing worn moving parts, to completely overhauling and possibly changing the entire working block, in appropriate maintenance departments.

As already said, the rotary pump is part of a pump station, which in turn is part of the productive plant. The plant generally consists of a machine characterized by high technology, high cost, and rapid obsolescence; the plant therefore has to be used to its maximum potential to ensure its favorable depreciation. In such a plant the rotary pump is a secondary element as regards value but it is essential for the work, so the frequent shutdown times due to the pump must be absolutely as short as possible.

The solution to this problem that is normally adopted is to keep a reserve pump ready; but this solution is clearly quite burdensome and technically not particularly satisfactory. In fact the need to disconnect the pump from the intake and delivery pipes and the electrical supply etc., and the difficulty of access already referred to, make substitution of the whole pump a very laborious operation and one which in any case requires it to be checked that the connection of the vacuum line has been correctly performed. Sometimes the remedy adopted is the radical one of keeping an entire station ready, with a further heavy increase in fixed assets. To do this however does not eliminate the loss of time needed to prepare the connections, while the operations necessary for maintenance simply become parallel to production time.

It is apparent from the aforegoing that until now no solutions have been devised which solve the problem of performing the operations of maintenance and restoring the pump to working order with a minimum of lost time and with contained costs.

In solutions such as that shown in FIG. 1, it is possible to replace the entire working block in a single operation. To do this it is also necessary to empty the oil and disassemble the housing 6 in order to gain access to the working block and extract it after unscrewing the screws 3 which connect it to the stand. Such an operation will inevitably involve polluting the working environment through the dripping of oil deposited on the walls of the working block. This is prejudicial to the good quality of the process when a high degree of cleanness is required in the environment, and it is intolerable for worker safety when the oil is contaminated with corrosive or toxic substances. The replacement of the working block therefore requires the whole pump to be in some way transported into a fitted workshop.

In one known solution of a pump with a particular internal arrangement it is possible to extract and replace the working block by gaining access through an opening in the top of the housing of the pump. But this case again does not solve the problem of avoiding direct contact between the operator and the contaminated oil, and dispersion of the oil in the working environment. In installations which limit access to the pump, the opening of the housing and the replacing of the working block can still prove to be extremely laborious. Since the work has to be done by hand only, this principle only allows maintenance on pumps of limited weight and hence limited capacity.

SUMMARY AND OBJECTS OF THE INVENTION

The present invention reduces and actually avoids the disadvantages that have been described, reducing plant shutdown time to a minimum. Having enabled the parts needing overhauling to be disassembled and transported to a workshop, at the same time the possibility of contact with the contaminated oil is avoided.

A pump as a whole may be considered as being composed of two fundamental parts:

A - one part consisting of the electric motor and its support stand, the stand consisting of a vertical body (with base), containing both the coupling which transmits the motion and the channels and connections for the intake and delivery of the gases, connected to the various external pipes; in this text this part will be identified by the name "actuating module";

B - one "functional" part, comprising the rotor or rotors with their rotating axle, stators, the delivery valves and any other element that effectively produces pumping action; this part is immersed in a special oil for reasons of leak tightness and lubrication, as stated before. In this text this part will be identified by the name "pump module".

It will be noted that the "pump module" is the only part which needs frequent servicing to restore working order.

The subject of the invention is therefore a rotary vacuum pump which can allow quick disassembly, which is subdivided into:

a first part comprising the electric motor and a support structure containing both the half-couple of the coupling which transmits the motion, and the channels and connections for the intake and delivery. of the gases, connected to the various external pipes and emerging at a coupling surface, said part constituting an "actuating module";

and a second functional part comprising the rotor or rotors with their rotating axle complete with half-couple, the stators, the delivery valves contained in a housing which contains the special liquid for leak-tightness and lubrication, said part constituting a "pump module" which can be coupled to and uncoupled from the actuating module at said coupling surface, where corresponding connections emerge.

Other characteristics are defined in the claims which follow the descriptive text.

The proposed solution makes the operation of detaching and reattaching the two modules easy and safe and makes the operation of extracting the pump module from the pump station rapid, and thus solves the problem of rapid and economic maintenance, at the same time guaranteeing maximum safety.

BRIEF DESCRIPTION OF THE DRAWINGS

The invention will be understood better by following the description and the attached drawing, which shows a practical, non-limiting embodiment of said invention. In the drawing.

DETAILED DESCRIPTION OF THE PREFERRED EMBODIMENT

Figure 2:
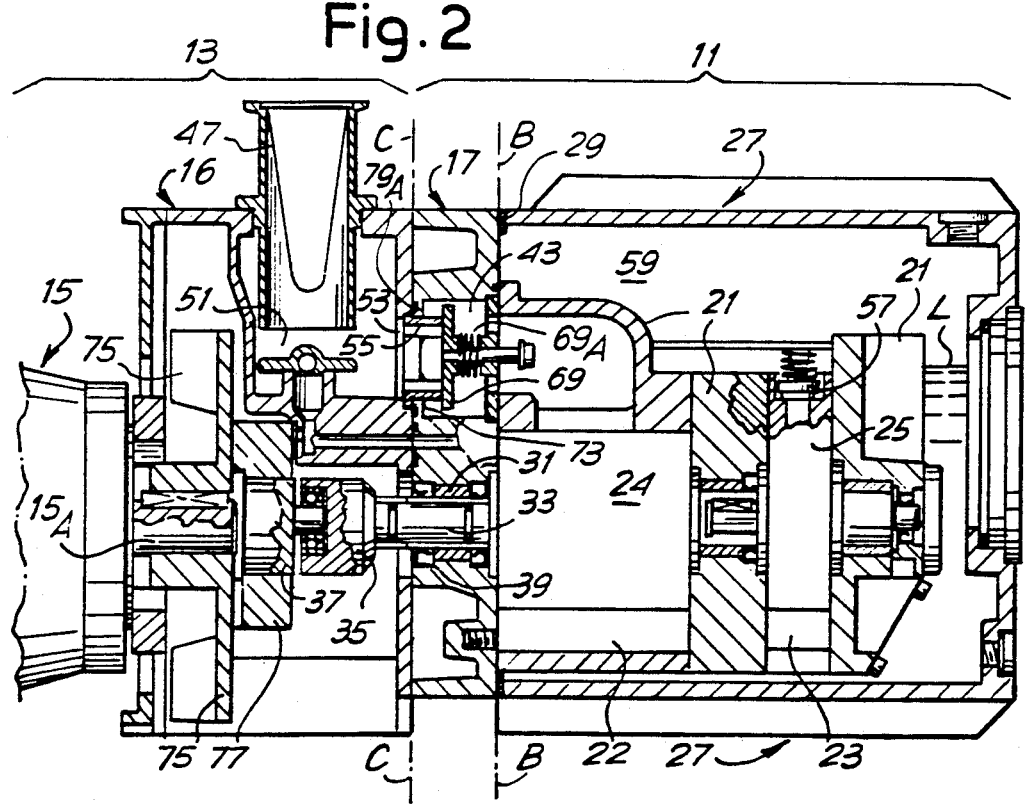
FIGS. 2 and 3 show a cross-section and a plan of an embodiment of the invention.

With reference to FIGS. 2 and following, 11 indicates the "pump module" and 13 the "actuating module" with motor 15 and stand 16; the "pump module" 11 is coupled to the stand 16 along the plane of line C—C.

The "pump module" 11 includes the slab 17 and the working block 21 which comprises the stator chambers 22 and 23 and the rotors 24 and 25 which activate the actual pumping; said block 21 is contained together with the lubricating oil L inside the containment housing 27. Said housing 27 is clamped against the slab 17 with the interposition of a seal 29, so as to prevent oil escaping.

Figure 1:
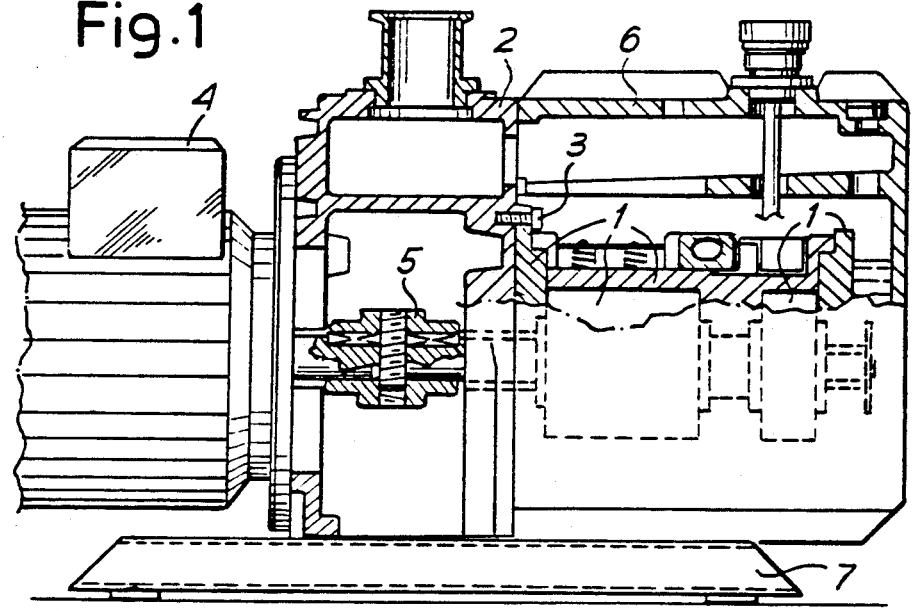
FIG. 1 shows a conventional solution already discussed.
Figure 3:
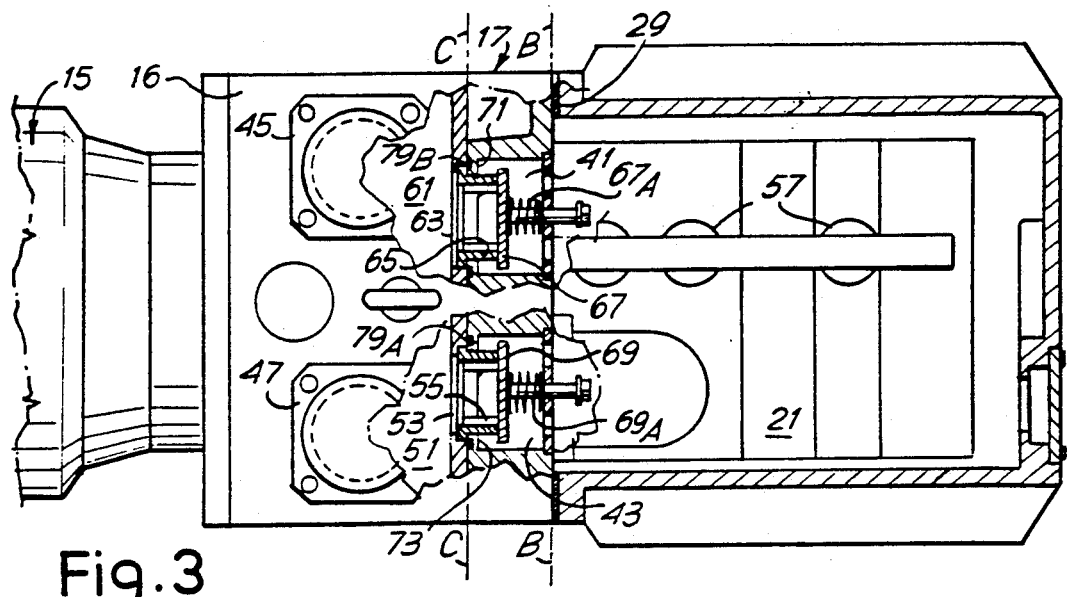
Figure 4:
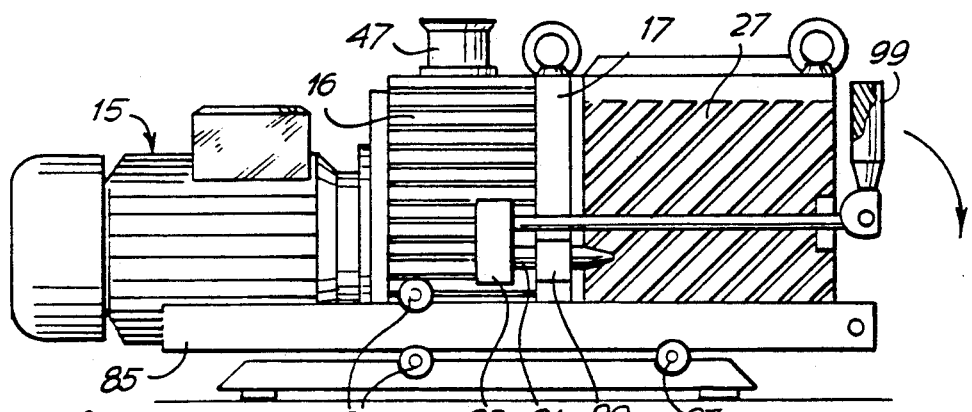
FIGS. 4 and 5 show a simplified side view of the relative positions of the two modules, coupled and apart.
Figure 5:
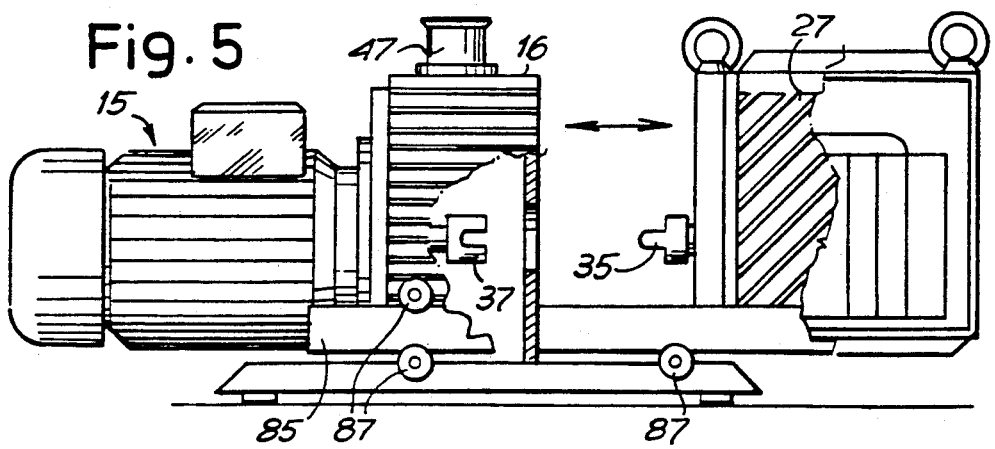
Figure 6:
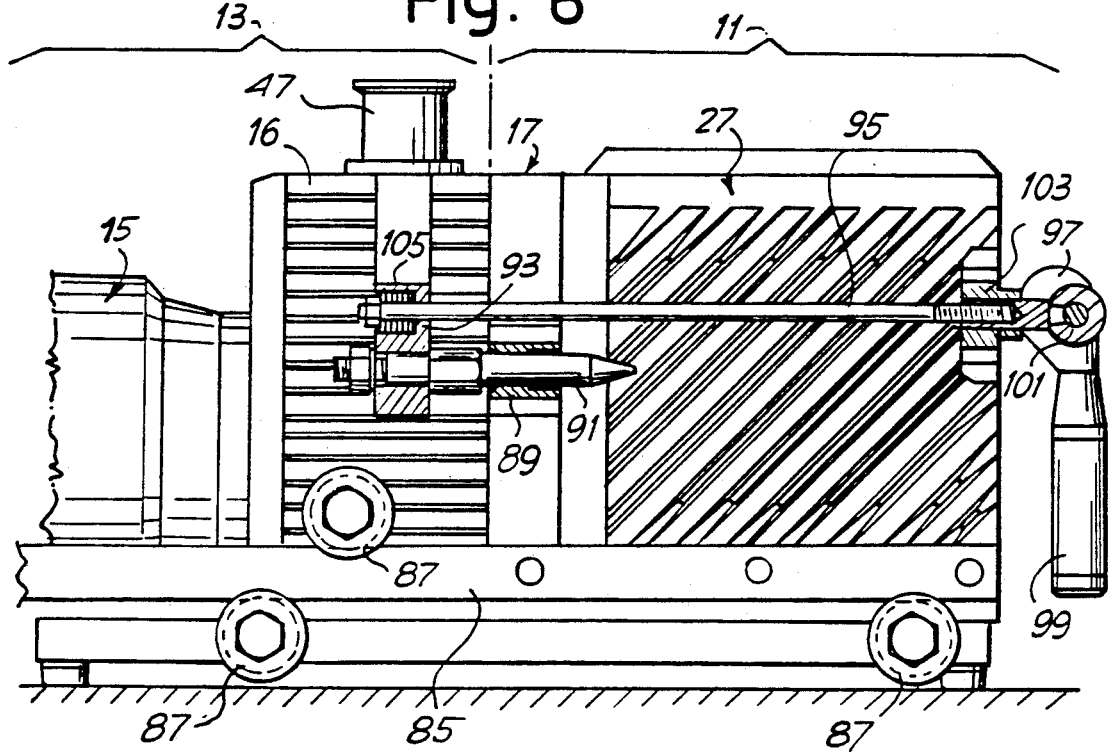
FIGS. 6 and 7 show details of devices for moving and locking.
Figure 7:
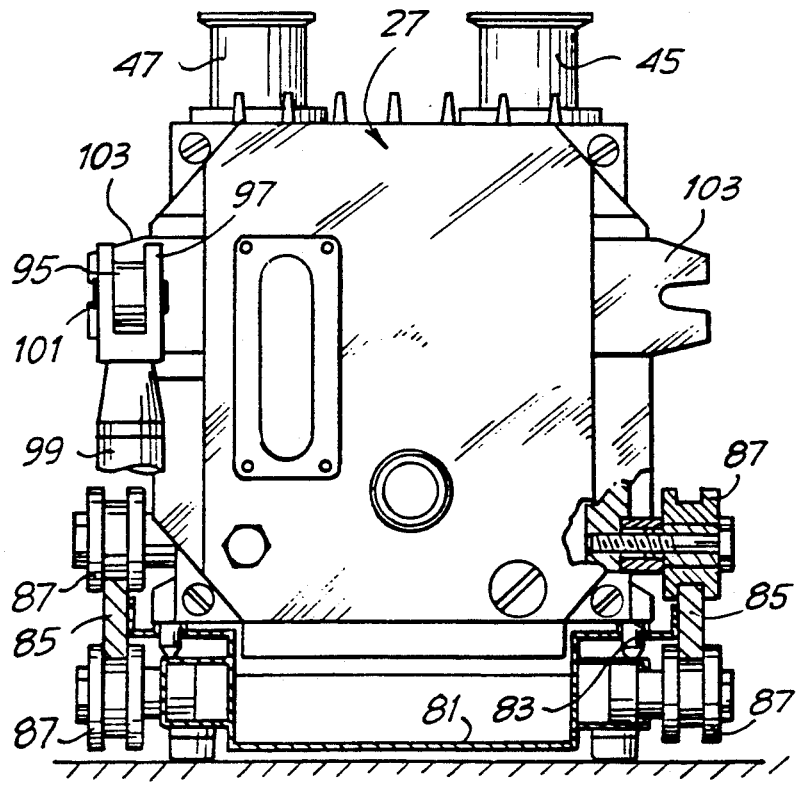

The working block 21 of the pump is likewise fixed to the slab 17 which also houses a bearing 31 which supports the pivot or shaft 33 of the first rotor 24 of the two rotors. The end of the pivot 33 emerges from the slab 17; to the pivot is keyed a pump coupling member 35 of the two coupling members 35, 37 of the drive coupling driven by the motor 15. The sealing ring 39 prevents loss of oil through the bearing 31 due to blow—by. It is clear that the side of the slab 17 extending over the plane B-B fulfills the function analogous to that fulfilled in the pump shown in FIG. 1 by the stand 2. Accordingly there must be the two ducts 41 and 43 on this slab 17 for the delivery and intake respectively of the pumped gases, and all other passages necessary to restore continuity to the various ducts as far as the side contained in the plane C—C of the slab 17 opposite that contained in the plane B—B and coupled to the stand 16. In this way the gases are able to flow from the delivery 45 and intake 47 flanges to the working block 21. In particular the intake flange 47 emerges in a chamber 51 formed by the casting of the stand 16; in turn the chamber 51 communicates with the passage 43 via a hole 53 in the side of the stand, at which point a collar 55 is fixed, with a window in its side. The gases that have been drawn in are re-expelled, as in all rotary pumps with blades, together with the lubricating oil, by delivery valves 57. The oil falls back down inside the housing 27 and the gases then occupy the top area 59 of said housing 27, to then flow through the passage 41 onto the delivery flange 45 (FIG. 3). As on the intake side the delivery flange emerges into a chamber 61 formed separately in the casting of the stand 16 and through a hole 63 positioned on the wall and communicates with the passage 41, the hole 63 being equipped with a collar 65 which has a window in its side. Poppet valves 67 and 69 are provided in the ducts 41 and 43 and stressed by springs 67A and 69A towards annular sealing seats 71 and 73 formed in the slab 17 at and around the collars 55 and 65 with the side windows, which in the assembled position hold open the valves 67, 71 and 69, 73 of the two passages 41 and 43.

The slab 17 constitutes an "interfacial slab" between the working block 21 and the support structure or stand 16 and must contain not only the ducts 43 and 41 but also those allowing so-called air ballast through and any that may be necessary to allow inert gases through for optional scavenging, which lead to the stand 16 and then onto the working block 21.

The whole stand 16 complete with intake 47 and delivery 45 flanges carries the actuating motor 15 mounted on the axle 15A of which are the cooling fan 75 and by means of a ring 77 the rotor coupling member 37. This as a whole constitutes the aforesaid "actuating module" 13. In turn the unit consisting of the slab 17, working block 1, oil-filled housing 27 and pump coupling member 35 constitutes the abovementioned "pump module" 11. All those parts on which the pumping operation depends and which therefore require frequent maintenance are contained in this "pump module" 11.

By virtue of the presence of the interfacial slab 17, the two modules are separable at the plane C—C of contact between the slab 17 and the stand 16. The "pump module" 11 can be separated from the slab 17 and transported into a workshop for repair, while the actuating module 13 with the slab 17 remains installed on the pump station ready to take a replacement pump module if so desired. The intake and delivery flanges 45 and 47 can remain connected to their respective pipes as can also any other electrical and pneumatic connections which lead to it. To ensure the continuity of the various ducts front sealing gaskets 79A, 79B are provided, being housed on that side of the slab 17 which lies in the plane of separation C—C and can be replaced every time the pump module 11 is removed and overhauled.

In order to avoid the possibility of contaminated oil leaking out during extraction and transport of the module—with risks to the safety of the operator and of polluting the environment—the automatic valves 67 and 69 are provided to intercept the ducts which come from inside the pump to the side in the plane C—C of the interfacial slab 17; at the moment the module 11 is separated, the valves 67 and 69 are no longer supported by the collars 55, 65 with their side openings, and come to bear against the seats 71 and 73, thereby closing off the passages 41 and 43.

The advantage of being able to separate into modules is particularly important for pumps whose capacity and weight is such that it is not possible to move them manually. In such cases in fact removal from the pump station of the whole pump is extremely laborious.

So as to make the separability workable in practice, on the pump there is provided guide means, preferably a sliding means for guiding and locking the entire pump module 11.

By way of example FIGS. 4 to 7 show one of the possible solutions for such a system.

The pump module 11 bears on a support 81 suitably shaped and strengthened. Their correct mutual positioning is ensured by pegs 83 which engage in the same number of holes in the support 81. Said support 81 is rigidly connected, on its flanks, to two rectilinear guides 85 arranged on the two sides of the pump, each able to slide on three idle pegs 87 which can be adjusted eccentrically to eliminate play and correctly position the sliding carriage formed by the support 81 and the guide 85. The carriage 81, 85 together with the pump module 11 can slide axially and carry the latter out of the way of the pump station. At this point it is possible to lift the module from the carriage and transport it into a workshop. The accommodating space on the carriage 81, 85 thus remains available for a new module.

Reference means are use in order to be sure of the correct mutual positioning of the two modules, in the final approach phase three pierced solid boxes 89 are provided on the interfacial slab 17, which cooperate with two pegs 91 fixed to respective widenings 93 of the stand 16. In this way perfect positioning is ensured of the sealing gaskets of the ducts and of the coupling members 35, 37 of the coupling for the transmission of the motion.

To increase the advantage of separability into modules and cut servicing times to a minimum, a locking means can be provided between the modules 11 and 13, which allows manual actuation by the operator, without requiring any kind of tool. For this purpose two tie rods 95 are provided which are installed on the widening 93 of the actuating module 13. At its other end each tie rod is connected to a cam 97 which is integral with a lever 99 articulated at 101 to the tie rod. The tie rod is made to tighten by acting on the lever 99 and hence pressing the cam 97 against a stop 103 on the flank of the housing 27 of the pump; the tightening load is obtained through the compressing of a series of Belleville spring washers 105 or the like positioned in a seating 106 for the tie rod and reacting of the widening 93. To permit both the free sliding of the pump module and engagement in the formed seats of the stops 103, the tie rods 95 are laterally free in their seats 106 and can be moved outwards slightly. This can be achieved by providing bearings which are slightly inclined downwards and outwards for the tie rods 95.

From what has ben described it is clear that the invention enables the disadvantages that have ben noted to date in the maintenance of pumps to be overcome. The advantages which are obtained can be summarized thus:

- greatly reduced amount of time lost in disassembling and reassembling;
- possibility of carrying out the various maintenance operations, whether foreseen or unforeseen, in a suitable place;
- lower capital investment; one spare pump module replaces in practice an entire pump and altogether avoids the need to have a pump station in reserve;
- certainty of efficiency of the connections between the pump and the system, inasmuch as they are not affected by replacement of the pump module.

I claim:

1. A vacuum pump comprising:
   an actuating module having, a support structure, a motor mounted on said support structure, a motor coupling member mounted on a rotating shaft of said motor, said support structure defining an intake flange and a delivery flange; and
   a second pump module having a stator chamber and rotor for pumping, a pump coupling member mounted on said rotor and engageable with said motor coupling member, said pump module defining an intake duct connectable to said intake flange, said pump module defining a delivery duct connectable to said delivery flange, said pump module defining a housing containing said stator and a fluid, and said pump module being disconnectable from said actuating module, valve means arranged in said intake and delivery ducts for automatically closing said intake and delivery ducts, upon said pump module disconnecting from said actuating module.

2. A pump in accordance with claim 1, further comprising:
   collars on said intake and delivery flanges for opening said valve means when said pump module and said actuating module are connected, said collars defining side openings.

3. A pump in accordance with claim 1, further comprising: reference means on said pump module and said actuating module for aligning said pump module and said actuating module into connection with each other.

4. A pump in accordance with claim 1, further comprising:
   guide means for moving and guiding the movement of one of said pump module and said actuating module in relation to the other of said pump module and said actuating module.

5. A pump in accordance with claim 4, wherein:
   said guide means contains sliding means for sliding one of said pump module and said actuating module.

6. A pump in accordance with claim 1, further comprising:

a slab mounted on said pump module between said pump module and said actuating module, said slab forming an interface between said pump module and said actuating module, said slab cooperating with said valve means and said pump coupling member.

7. A pump in accordance with claim 1, wherein:
said support structure supports said motor in a cantilevered position.

8. A pump in accordance with claim 1, further comprising:
a locking means for bringing and fastening said pump module and said actuating module together.

9. A pump in accordance with claim 8, wherein:
said locking means comprises elastic tie means mounted on one of said pump module and said actuating module, and forked stops engageable with said elastic tie means mounted on one other of said pump module and said actuating module.

10. A pump in accordance with claim 8, wherein:
said elastic tie means are equipped with cam means.

* * * * *